US009154190B2

(12) United States Patent
Hill (10) Patent No.: US 9,154,190 B2
(45) Date of Patent: Oct. 6, 2015

(54) MASTER MOBILE WIRELESS COMMUNICATIONS DEVICE WITH NEAR FIELD COMMUNICATION (NFC) CAPABILITIES TO SEND MEDIA CONTENT TO SLAVE MOBILE WIRELESS COMMUNICATIONS DEVICES AND ASSOCIATED METHODS (75) Inventor: Thomas C. Hill, Crystal Lake, IL (US)

(73) Assignee: BlackBerry Limited, Waterloo (CA)

( * ) Notice: Subject to any disclaimer, the term of this patent is extended or adjusted under 35 U.S.C. 154(b) by 350 days.

(21) Appl. No.: 13/027,715

(22) Filed: Feb. 15, 2011

(65) Prior Publication Data
US 2012/0208455 A1 Aug. 16, 2012

(51) Int. Cl.
*H04B 5/00* (2006.01)
*G06Q 20/32* (2012.01)

(52) U.S. Cl.
CPC .............. *H04B 5/0031* (2013.01); *G06Q 20/32* (2013.01)

(58) Field of Classification Search
CPC .......... H04M 1/7253; H04M 2250/04; H04M 2250/02; H04M 2250/64; H04M 2250/22; H04W 4/008; H04W 28/18; H04W 76/02; H04W 48/16; H04W 4/206; H04W 8/005; H04W 8/22; H04B 5/00; H04B 5/0031; H04L 67/10; H04L 67/1095; H04N 21/252; H04N 21/2668; H04N 21/472; H04N 21/47; G06F 3/017; G06F 3/0486; G06F 3/0488; G06F 17/30165
See application file for complete search history.

(56) References Cited

U.S. PATENT DOCUMENTS

| | | | | |
|---|---|---|---|---|
| 2003/0073411 | A1* | 4/2003 | Meade, II | 455/70 |
| 2007/0121541 | A1* | 5/2007 | Matsuo | 370/328 |
| 2008/0039212 | A1 | 2/2008 | Ahlgren et al. | 463/46 |
| 2008/0305738 | A1* | 12/2008 | Khedouri et al. | 455/3.06 |
| 2009/0111378 | A1 | 4/2009 | Sheynman et al. | 455/41.1 |
| 2009/0144435 | A1* | 6/2009 | Naniyat | 709/228 |
| 2010/0081385 | A1* | 4/2010 | Lin et al. | 455/41.3 |
| 2010/0082136 | A1* | 4/2010 | Rosenblatt et al. | 700/94 |
| 2010/0211679 | A1* | 8/2010 | Kumar et al. | 709/225 |

(Continued)

FOREIGN PATENT DOCUMENTS

| | | | | |
|---|---|---|---|---|
| EP | 1132847 | A2 * | 9/2001 | G06F 17/60 |
| EP | 1793531 | | 6/2007 | H04L 12/28 |

OTHER PUBLICATIONS

"Easter Egg: Yelp is the iPhone's First Augmented Reality App" http://mashable.com/2009/08/27/yelp-augmented-reality/ printed Feb. 8, 2011.

(Continued)

*Primary Examiner* — Alejandro Rivero
(74) *Attorney, Agent, or Firm* — Steven M. Greenberg, Esq.; Donna Flores, Esq.; CRGO Law (57) ABSTRACT A communications system includes a plurality of slave mobile wireless communications devices each having a first near field communications (NFC) device. The communications system also includes a master mobile wireless communications device having second NFC device, and a processor coupled to the second NFC device. The processor is configured to associate different content items with different respective slave mobile wireless communications devices, based upon NFC communication with the plurality of slave mobile wireless communications devices, and to send the different content items to the different respective slave mobile wireless communications devices.

19 Claims, 7 Drawing Sheets (56) References Cited

U.S. PATENT DOCUMENTS

| | | | |
|---|---|---|---|
| 2011/0025816 A1 | 2/2011 | Brewer et al. | 348/14.02 |
| 2011/0083111 A1* | 4/2011 | Forutanpour et al. | 715/863 |
| 2011/0289147 A1* | 11/2011 | Styles et al. | 709/205 |
| 2011/0316790 A1* | 12/2011 | Ollila et al. | 345/173 |

OTHER PUBLICATIONS http://secondlife.com/?v=1.1 printed Feb. 9, 2011.

Kapor, "*Hands Free 3D: Second Life Navigation Demo*" http://www.ideasproiect.com/contentwebui?id=2913 printed Feb. 9, 2011.

\* cited by examiner

МASTER MOBILE WIRELESS
COMMUNICATIONS DEVICE WITH NEAR
FIELD COMMUNICATION (NFC)
CAPABILITIES TO SEND MEDIA CONTENT
TO SLAVE MOBILE WIRELESS
COMMUNICATIONS DEVICES AND
ASSOCIATED METHODS

TECHNICAL FIELD

The present disclosure relates to the field of mobile wireless communications devices, and, more particularly, to mobile wireless communications devices for communicating with payment processing systems.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a communications system may include a plurality of slave mobile wireless communications devices each having a first near field communications (NFC) device. The communications system may also include a master mobile wireless communications device comprising a second NFC device, and a processor coupled to the second NFC device. The processor may be configured to associate different content items with different respective slave mobile wireless communications devices, based upon NFC communication with the plurality of slave mobile wireless communications devices, and send the different content items to the different respective slave mobile wireless communications devices. This advantageously allows quick and easy distribution of content items to the proper slave mobile wireless communications devices.

In some applications, the plurality of slave mobile wireless communications devices may have different media playback features, and the processor may be configured to associate the different content items with the different respective slave mobile wireless communications devices based upon the different media playback features. The different media playback features may comprise at least one of video playback capability, audio playback capability, text display capability, multimedia platform display capability, or playback quality.

The content items may comprise different media types, the processor may associate the different content items with the different respective slave mobile wireless communications device based upon matching media playback features with the media types. The different media types may comprise at least one of video, audio, or text.

In addition, the different content items may comprise different portions of a processing task. The plurality of slave mobile wireless communications devices may have different media playback features, and the processor may be configured to split the different portions of the content items to different respective slave mobile wireless communications devices based upon the different media playback features.

Different content items may have different content categories, and the processor may be configured to associate the different content items with the different respective slave mobile wireless communications devices based upon the different content categories.

Further, the master mobile wireless communications device may also include an input device, and the processor may be configured to cooperate with the input device to generate a priority list, and associate the different content items with the different respective slave mobile wireless communications devices based upon the priority list.

A given slave mobile wireless communications device may have a touch sensitive screen. The master mobile wireless communications device may be configured to associate a given content item with the given slave mobile wireless communications device based upon the touch sensitive display thereof. In addition, the processor may be configured to send a presentation time for a given content item to at least one slave mobile wireless communications device.

A method aspect is directed to a method of operating communications system comprising a plurality of slave mobile wireless communications devices each having a first near field communications (NFC) device, and a master mobile wireless communications device. The method may include associating different content items with different respective slave mobile wireless communications devices, based upon NFC communication with the plurality of slave mobile wireless communications devices, using a processor of the mobile wireless communications device in cooperation with a second NFC device thereof. The method may also include sending the different content items to the different respective slave mobile wireless communications devices, using the processor.

Figure 1:
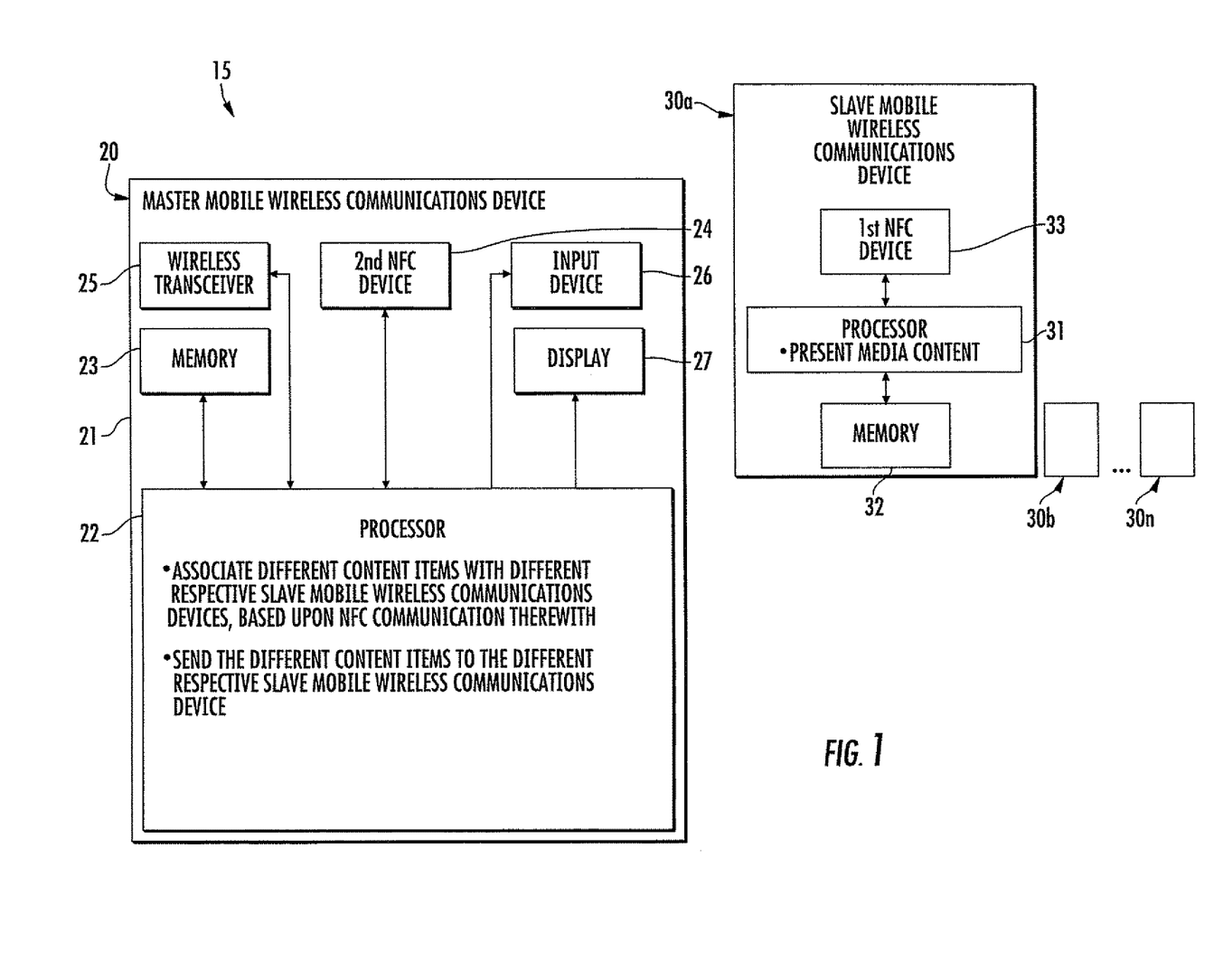
FIG. 1 is a schematic block diagram of a communications system in accordance with an example embodiment.

Referring initially to FIG. 1, a communications system 15 is now described. The communications system 15 includes a master mobile wireless communications device 20 and a plurality of slave mobile wireless communications devices 30a-30n. The master mobile wireless communications device 20 and the slave mobile wireless communications devices 30a-30n may be portable or personal media players (e.g., music or MP3 players, video players, etc.), remote controls (e.g., television or stereo remotes, etc.), portable gaming devices, portable or mobile telephones, smartphones, tablet computers, etc. It should be appreciated that the master mobile wireless communications device 20 and the slave mobile wireless communications devices 30a-30n may be different devices as described above, or may each be a same device. For example, the master mobile wireless communications device 20 may be a smartphone, and the slave mobile wireless communications devices 30a-30n may be tablet computers, in some applications.

The master mobile wireless communications device 20 includes a processor 22 coupled to a memory 23. The memory 23 may include volatile and non-volatile portions, and may be configured to store content items, such as audio and video files.

Also coupled to the processor 22 are an input device 26, a display 27, a wireless transceiver 25, and a second NFC device 24. A housing 21 carries the processor 22, memory 23, input device 26, display 27, wireless transceiver 25, and second NFC device 24. The input device 26 may be a keyboard, touch sensitive pad, trackball, thumbwheel, button, or other suitable device, for example. It should be appreciated that in some applications, the display 27 may be a touch sensitive display, and may therefore serve as an input device. In addition, the wireless transceiver 25 may be a cellular transceiver, and may be configured to perform both voice and data cellular communications. Other wireless formats may also be used, such as WiFi, WiMAX, etc.

The slave mobile wireless communications device 30a includes a processor 31 coupled to a memory 32 and a first NFC device 33. The other slave mobile wireless communications devices 30b . . . 30n may include similar features as the slave mobile wireless communications device 30a.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

The processor 22 of the master mobile wireless communications device 20 is configured to associate different content items with different respective slave mobile wireless communications devices 30a-30n, based upon NFC communication therewith. Next, the processor 22 sends the different content items to the different respective slave mobile wireless communications devices 30a-30n via the first NFC device 33 and second NFC device 24. The processor 31 of a given slave mobile wireless communications device 30a may then present the media content. The communications system 10 therefore advantageously allows the quick and easy routing of content from the master mobile wireless communications device 20 to an appropriate slave wireless communications device 30a.

In some applications, the processor 22 may associate the different content items with different slave mobile wireless communications devices 30a-30n based upon the content itself. For example, the memory 23 may store a preference list associating certain content with certain slave mobile wireless communications devices 30a-30n, and the processor 22 may make the associations based upon that preference list. The preference list may be based upon a type of the content (e.g. audio content, video content, etc.), a genre of the content (e.g. classical music, opera music, comedy video, etc.), or something else related to the content. This preference list may be input via the input device 26 or may be received via a wireless communication.

In other applications, the associations may be determined based upon matching different media playback features of the slave mobile wireless communications devices 30a-30n to different media types. Such an embodiment is now described with reference to the communications system 115 of FIG. 2.

Figure 2:
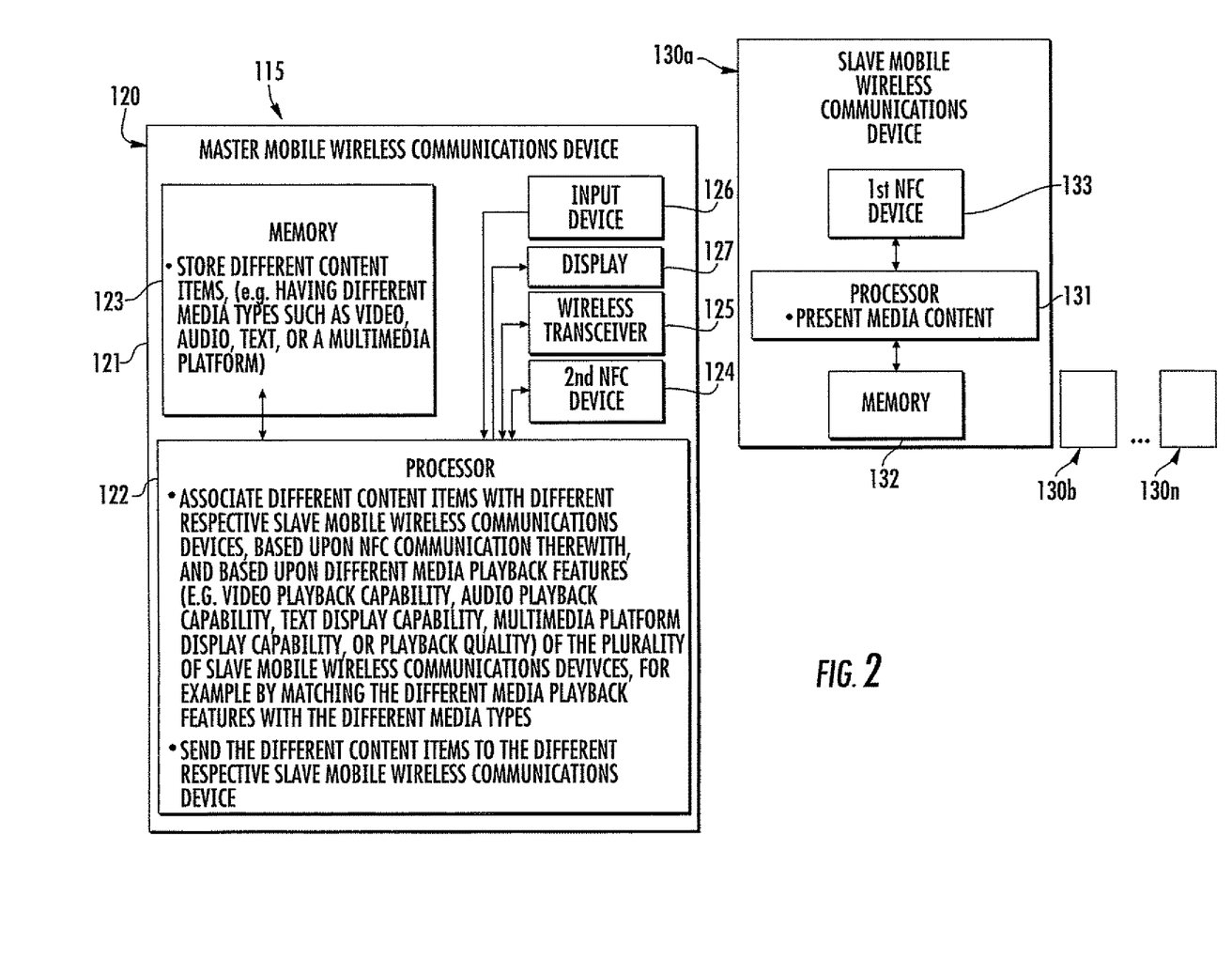
FIG. 2 is a schematic block diagram of a communications in accordance with an alternative example embodiment.

The communications system 115 includes a master mobile wireless communications device 120 and a plurality of slave mobile wireless communications devices 130a-130n. The master mobile wireless communications device 120 includes a housing 121, a processor 122 carried by the housing and coupled to a memory 123 also carried by the housing, a second NFC device 124 carried by the housing, a wireless transceiver 125 carried by the housing, an input device 126 carried by the housing, and a display 127 carried by the housing. The second NFC device 124, wireless transceiver 125, input device 126, and display 127 are similar to the second NFC device 24, wireless transceiver 25, input device 26, and display 27 of the communications system 15 described above with reference to FIG. 1. Therefore, these components require no further discussion herein.

The plurality of slave mobile wireless communications devices 130a-130n may each have different media playback features. Example media playback features include video playback capability, audio playback capability, and text display capability. It should be understood that this may encompass and multimedia platform (e.g., Flash, HTML5) display capability. Video playback capability may include the capability to play a variety of video file formats (e.g., AVI, MPEG, WMV, etc.), and audio playback capability may similarly include the capability to play a variety of audio file formats (e.g., WAV, MP3, FLAC, etc.). It should be understood that video playback capability can also refer to whether a particular slave mobile wireless communications device of the plurality thereof 130a-130n has a display screen, and that audio playback capability can similarly refer to whether a particular slave mobile wireless communications device has a speaker or an audio output connection.

Text display capabilities may include the capability to display textual content stored in a variety of file formats, such as PDF files and TXT files. In addition, text display capabilities may refer to whether a particular slave mobile wireless communications device of the plurality thereof 130a-130n has a display screen, or what type of display screen the particular slave mobile wireless communications device has (e.g. E Ink, LCD, etc.). Multimedia platform display capabilities may include the capability to display files displayable using a variety of multimedia platforms, such as FLASH or HTML5.

In this example embodiment, the memory 123 stores content having different media types, such as video media, audio media, textual media, or media displayable using a multimedia platform. It should be understood that a given item of content may include a plurality of different media types. For example, an item of content may include both video and audio media.

The processor 122 is configured to associate different content items with different slave mobile wireless communications devices 130a-130n based upon NFC communication therewith, and based upon different media playback features thereof. This association may be done by matching the different media playback features with different media types, for example. The processor 122 sends the different content items to the slave mobile wireless communications devices 130a-130n via the first NFC device 133 and second NFC device 124. The processor 122 may determine the media playback features of the slave mobile wireless communications devices 130a-130n by querying them for their media playback features, or by querying them for their model type or number, for example.

This communications system 115 therefore allows relatively quick and easy transfer of media content from the master mobile wireless communications device 120 to an appropriate slave mobile wireless communications device 130a. Thus, a media content item having video content would be appropriately sent to a slave mobile wireless communications device of the plurality thereof 130a-130n able to display that video content, or a media content item having audio content would be sent to a slave mobile wireless communications device able to play that audio content.

In some applications, the playback quality offered by a given slave mobile wireless communications device of the plurality thereof 130a-130n may be considered to be a media playback feature, and content items may be associated with the slave mobile wireless communications devices 130a-130n based upon the playback quality. For example, all the slave mobile wireless communications devices 130a-130n may be capable of playing a media content item having audio content, but the slave mobile wireless communications device 130a may be able to play audio content at a higher quality than the other slave mobile wireless communications devices 130b . . . 130n. The processor 122 would therefore associate a content item having audio with the slave mobile wireless communications device 130a. This advantageously allows the slave mobile wireless communications device of the plurality thereof 130a-130n able to present the media content at a highest quality to quickly and easily receive the media content from the master mobile wireless communications device 120a.

As explained above, in some cases, a given content item may include two or more media types, or portions of a processing task. Therefore, in some applications, it may be desirable to split the media types or portions of a processing task of a content item among a plurality of slave mobile wireless communications devices 230a-230n. This functionality is now described in detail with reference to the communications system 215 shown in FIG. 3.

Figure 3:
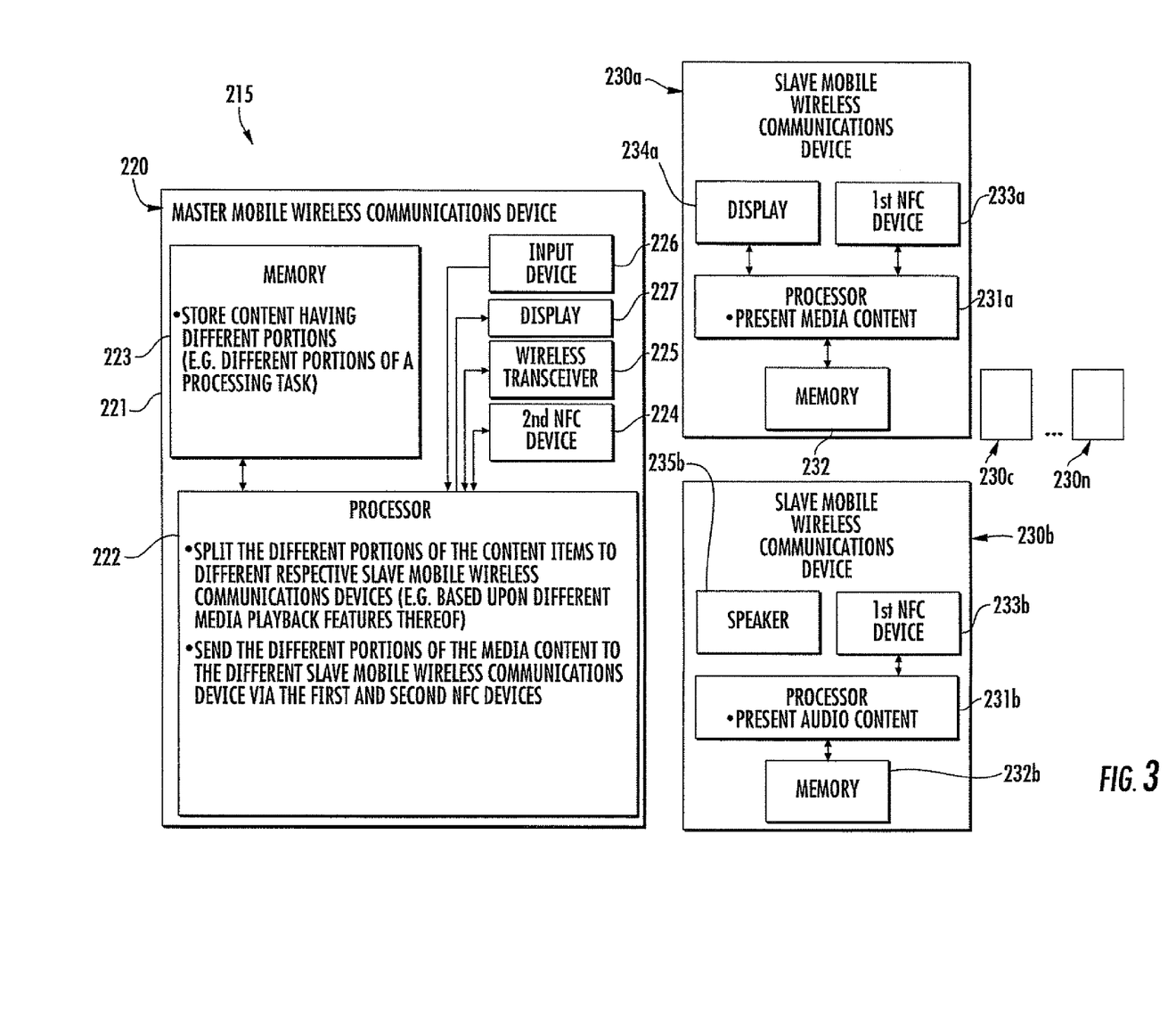
FIG. 3 is a schematic block diagram of a communications system in accordance with an additional example embodiment.

The communications system 215 includes a master mobile wireless communications device 220 and a plurality of slave mobile wireless communications devices 230a-230n. The master mobile wireless communications device 220 includes a housing 221 carrying a processor 222 coupled to a memory 223 also carried by the housing, a second NFC device 224 carried by the housing, a wireless transceiver 225 carried by the housing, an input device 226 carried by the housing, and a display 227 carried by the housing. The second NFC device 224, wireless transceiver 225, input device 226, and display 227 are similar to the second NFC device 24, wireless transceiver 25, input device 26, and display 27 of the communications system 15 described above with reference to FIG. 1. Therefore, these components require no further discussion herein.

In this example embodiment, the slave mobile wireless communications devices 230a-230n have different media playback features. For example, the slave mobile wireless communications device 230a includes a processor 231a coupled to a first NFC device 233a, a memory 232a, and a display 234a, and has video playback capability. The slave mobile wireless communications device 230b includes a processor 231b coupled to a first NFC device 233b, a memory 232b, and a speaker 235b, and has audio playback capability.

The processor 222 of the master mobile wireless communications device 220 is configured to split the different portions of content items to different slave mobile wireless communications devices 230a-230n, for example based upon different media playback features thereof. The processor 222 then sends the different portions of the content to the different slave mobile wireless communications devices 230a-230n using the first NFC devices 233a-233n and the second NFC device 224.

By way of example, the processor 222 can split audio content and video content from a given content item, send the video content to the slave mobile wireless communications device 230a since that device has video playback capability, and send the audio content to the slave mobile wireless communications device 230b since that device has audio playback capability. It should be understood that the video and audio content may originally be stored together as a given content item, such as an AVT file, and that the processor 222 may split the video content and audio content from that content item, using techniques known to those of skill in the art.

It should be understood that the processor 222 may also split the content between the different slave mobile wireless communications devices 230a-230n based upon playback quality. For example, both the slave mobile wireless communications devices 230a, 230b may be capable of audio and video playback, but the slave mobile wireless communications device 230a may be capable of video playback at a higher quality than the slave mobile wireless communications device 230b, while the slave mobile wireless communications device 230b is capable of audio playback at a higher quality than the slave mobile wireless communications device 230a. Therefore, the processor 222 may split the video content of the content item to the slave mobile wireless communications device 230a, and the audio content to the slave mobile wireless communications device 230b.

This communications system 215 therefore enables the slave mobile wireless communications devices 230a-230n to cooperate to present the different portions of the media content at a highest possible quality. When the different portions of a processing task are sent to different slave mobile wireless communications devices 230a-230n, the slave mobile wireless communications devices 230a-230n may then each execute their respective portion of the processing task, thereby creating a parallel processing system.

in other applications, it may be desirable for the processor 222 to associate different content items with different slave mobile wireless communications devices 330a based on a priority list. Such an example embodiment is now described in detail with reference to the communications system 320 shown in FIG. 4.

Figure 4:
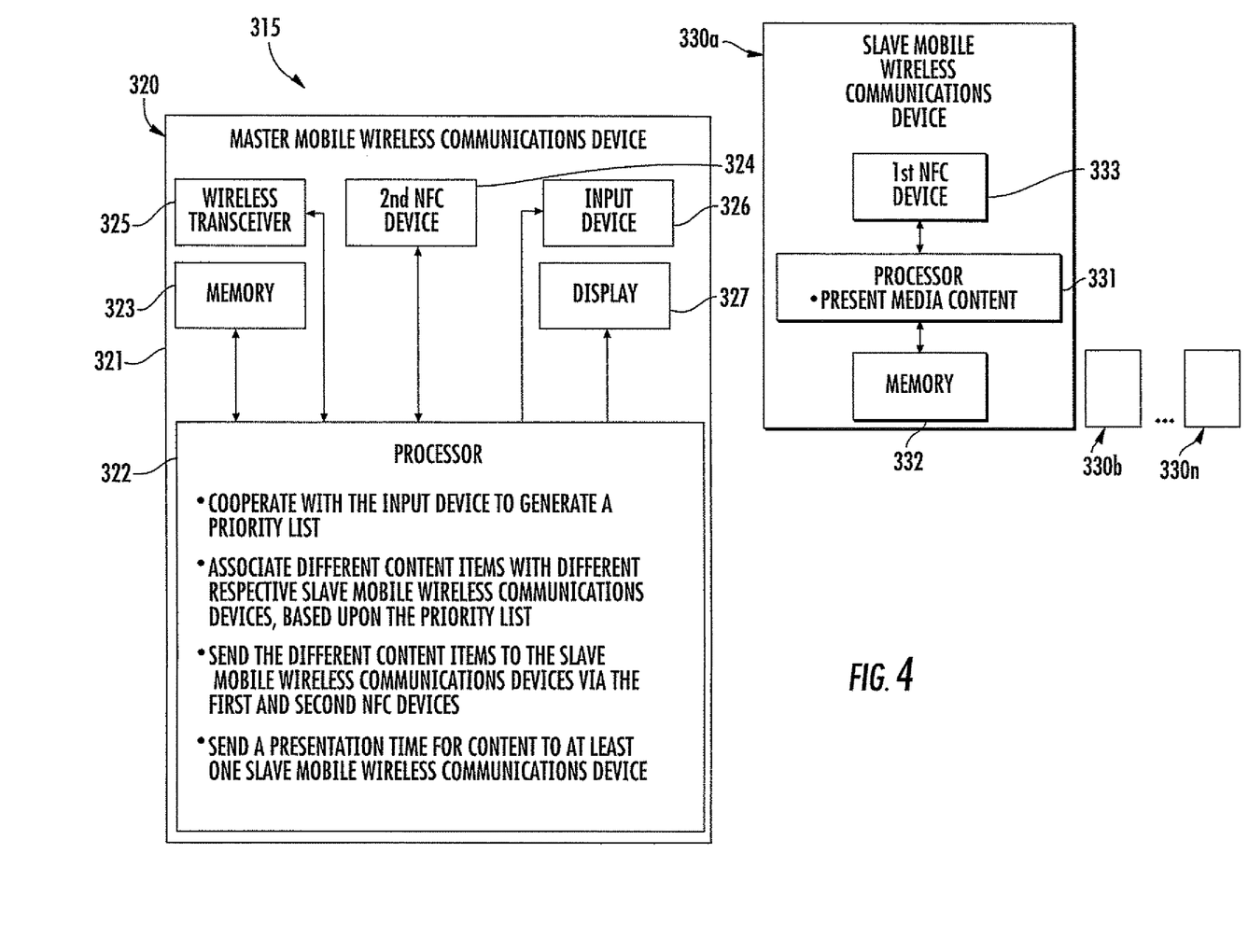
FIG. 4 is a schematic block diagram of a communications system in accordance with a further example embodiment.

The communications system 315 includes a master mobile wireless communications device 320 and a plurality of slave mobile wireless communications devices 330a-330n. The master mobile wireless communications device 320 includes a processor 322 carried by a housing 321 and coupled to a memory 323 also carried by the housing, a second NFC device 324 carried by the housing, a wireless transceiver 325 carried by the housing, an input device 326 carried by the housing, and a display 327 carried by the housing. The second NFC device 324, wireless transceiver 325, input device 326, and display 327 are similar to the second NFC device 24, wireless transceiver 25, input device 26, and display 27 of the communications system 15 described above with reference to FIG. 1. Therefore, these components require no further discussion herein.

In this example embodiment, the processor 322 of the master mobile wireless communications device 320 is configured to cooperate with the input device 326 to generate a priority list. By cooperating with the input device 326, it is meant that the processor 322 can either directly accept input of a priority list via the input device 326 in a configuration mode, or may generate the priority list based upon input received via the input device 326 over a period of time in a regular operation mode. It should also be understood that an entire priority list may be uploaded to the mobile wireless communications device 330a . . . 330n at once, or that a priority of the items may be selected individually.

The priority list specifies which slave mobile wireless communications devices 330a-330n receive which content items. For example, the priority list may specify that one slave mobile wireless communications device 330a is to receive audio content items, while another slave mobile wireless communications device 330b is to receive video content items. As another example, the priority list may specify that one slave mobile wireless communications device 330a is to receive audio or video content items relating to a first genre (e.g., opera music) while another slave mobile wireless communications device 330b is to receive audio or video content items relating to a second genre (e.g., classical music.)

The processor 320 associates different content items with different respective slave mobile wireless communications devices 330a-330n based upon the priority list. The processor 320 then sends the content items to the slave mobile wireless communications devices 330a-330n via the first NFC device 333 and second NFC device 324.

This communications system 315 therefore allows the master mobile wireless communications device 320 to pre-establish a priority list based upon the input device 326 and to then quickly and easily route media content to the slave mobile wireless communications devices 330a-330n based upon the priority list. This saves time, as no input is used to determine where the media content should be sent after the initial establishment of the priority list. In addition, the processor 322 may send a presentation time for content to at least one slave mobile wireless communications device.

In some example embodiments, it may be desirable for the slave mobile wireless communications device 330a to be manually associated via an input device thereof. Such an example embodiment is now described with reference to the communications system 415 of FIG. 4.

Figure 5:
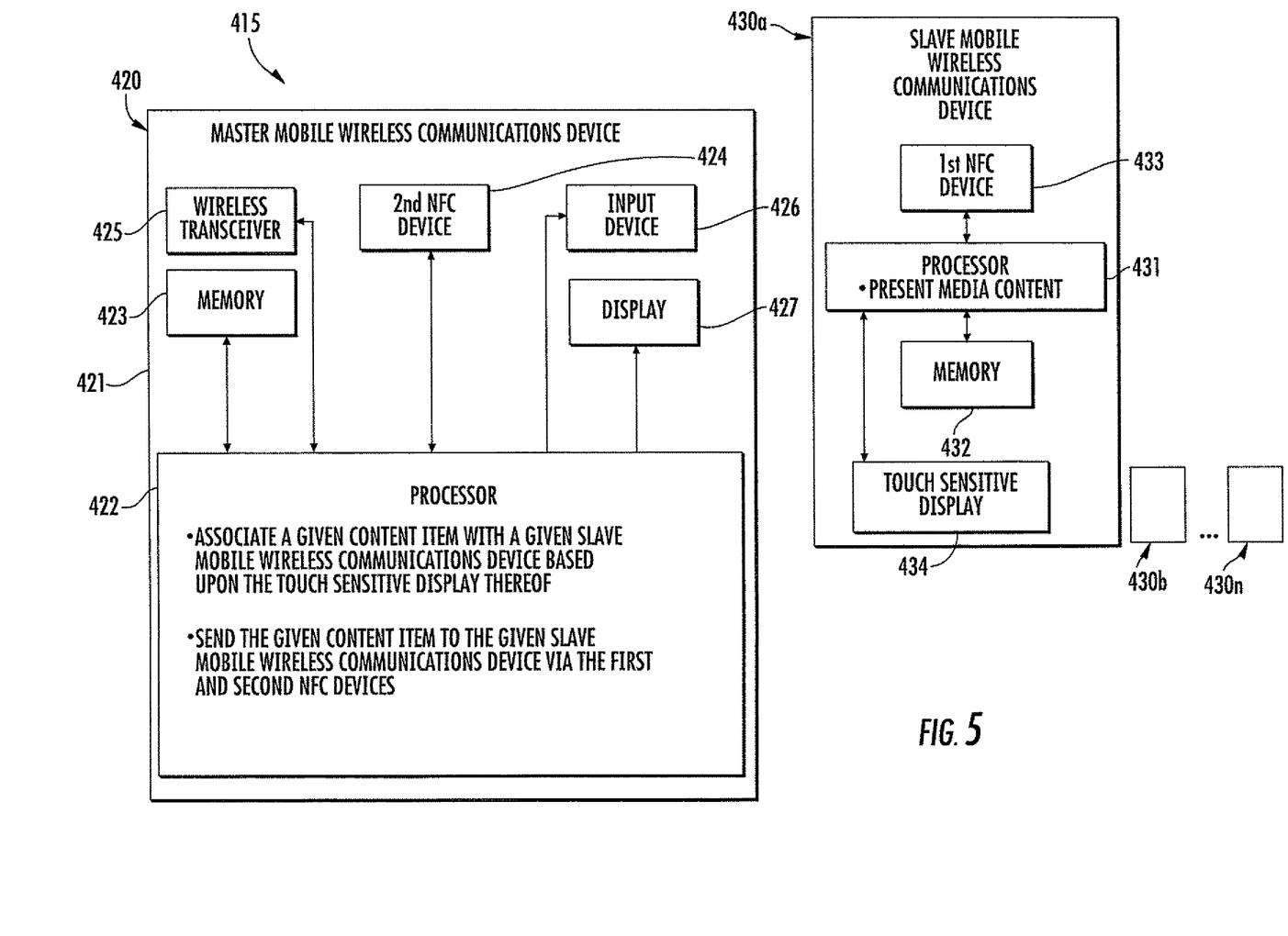
FIG. 5 is a schematic block diagram of a communications system in accordance with yet another example embodiment.

The communications system 415 includes a master mobile wireless communications device 420 and a plurality of slave mobile wireless communications devices 430a-430n. The master mobile wireless communications device 420 includes a processor 422 carried by a housing 421 coupled to a memory 423 also carried by the housing, a second NFC device 424 carried by the housing, a wireless transceiver 425 carried by the housing, an input device 426 carried by the housing, and a display 427 carried by the housing. The second NFC device 424, wireless transceiver 425, input device 426, and display 427 are similar to the second NFC device 24, wireless transceiver 25, input device 26, and display 27 of the communications system 15 described above with reference to FIG. 1. Therefore, these components require no further discussion herein.

In this example embodiment, the slave mobile wireless communications device 430a includes a processor 431 coupled to a first NFC device 433, a memory 432, and a touch sensitive display 434. The processor 422 of the master mobile wireless communications device 420 is configured to associate a given content item with a given slave mobile wireless communications device 430a based upon the touch sensitive display 434 thereof. This may be accomplished by the processor 431 of the slave mobile wireless communications device 430a, when in NFC communications range with the master mobile wireless communications device 420, sending a signal to the master mobile wireless communications device indicating that the touch sensitive display 434 has been touched.

The processor 422 then sends the content item to the slave mobile wireless communications device 430a via the first NFC device 433 and the second NFC device 424. This advantageously allows quick and easy selection of the slave mobile wireless communications device 430a based upon physical touch.

In some applications, the display 427 of the master mobile wireless communications device 420 may also be touch sensitive. Content may be presented on the display 427, and then "dragged" off that display and "onto" the touch sensitive display 434 of the slave mobile wireless communications device 430a. This operation may be performed both during actual presentation of the media content, or in a listing of the content items. If performed on a listing of the content items, an icon, symbol, or word representing a media content item may be selected on the display 427, then dragged off that display and onto the touch sensitive display 434 of the slave mobile wireless communications device 430a.

Figure 6:
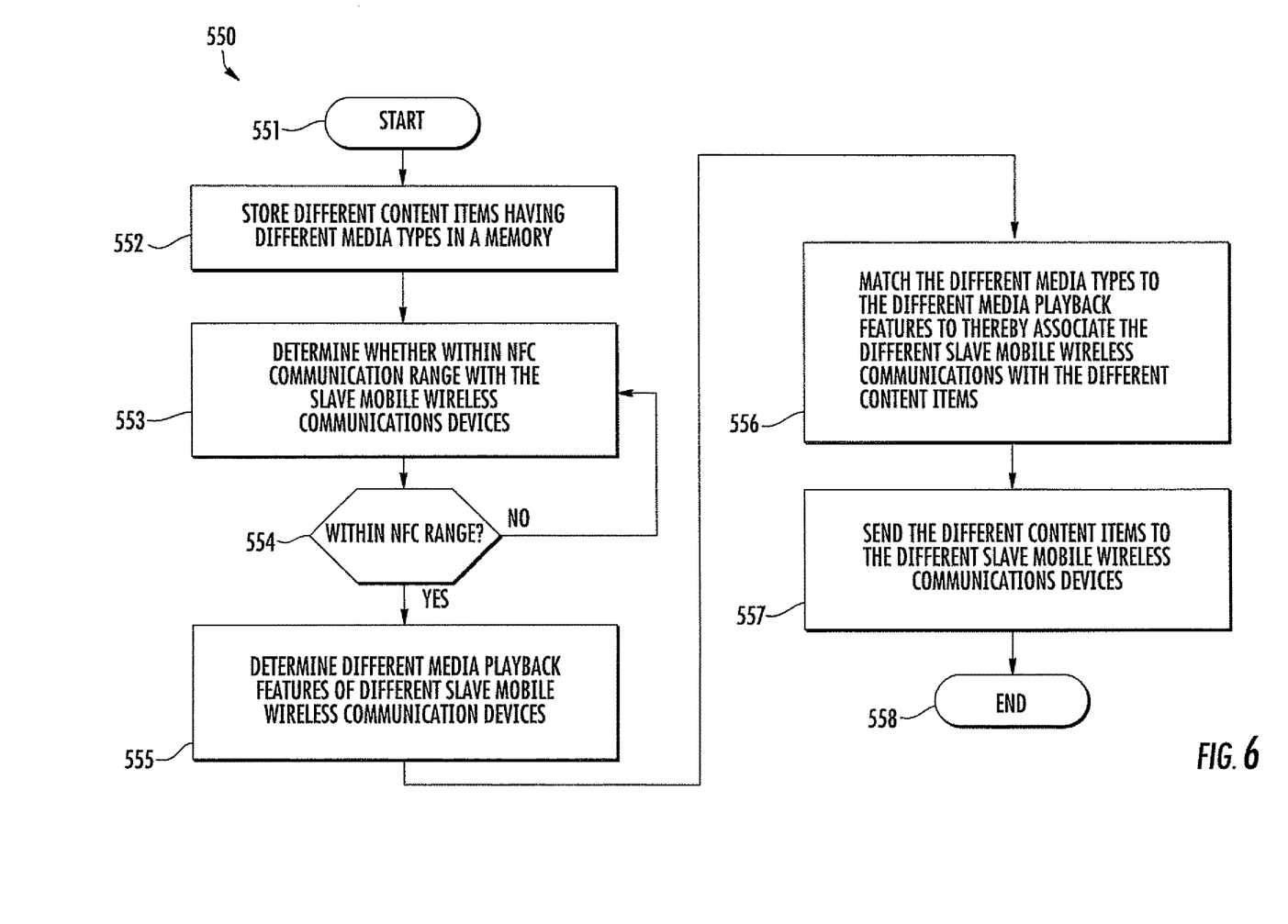
FIG. 6 is a flowchart of method of operating a master mobile wireless communications device in accordance with an example embodiment.

A method of operating a master mobile wireless communications device 20 is now described with reference to the flowchart 550 of FIG. 6. After the start (Block 551), different content items having different media types are stored in a memory 23 (Block 552). Next, it is determined whether the master mobile wireless communications device 20 is within NFC communication range with the slave mobile wireless communications devices 30a-30n (Block 553). At Block 554, if the master mobile wireless communications device 20 is not within NFC communication range with the slave mobile wireless communications devices 30a-30n, then the master mobile wireless communications device returns to determining whether the master mobile wireless communications device is within NFC communication range with the slave mobile wireless communications devices at Block 553.

On the other hand, if at Block 554 the master mobile wireless communications device 20 is within NFC communication range with the slave mobile wireless communications devices 30a-30n, then the master mobile wireless communications device 20 determines different media playback features of different slave mobile wireless communications devices, at Block 555. The master mobile wireless communications device 20 then matches the different media types to the different media playback features to thereby determine at least one selected slave mobile wireless communications device to receive the media content 30a (Block 556). The media content is then sent to the at least one selected mobile wireless communications device 30a (Block 557). Block 558 indicates the end of the method.

Example components of a mobile wireless communications device 1000 that may be used in accordance with the above-described embodiments are further described below with reference to FIG. 7. The device 1000 illustratively includes a housing 1200, a keyboard or keypad 1400 and an output device 1600. The output device shown is a display

1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 7:
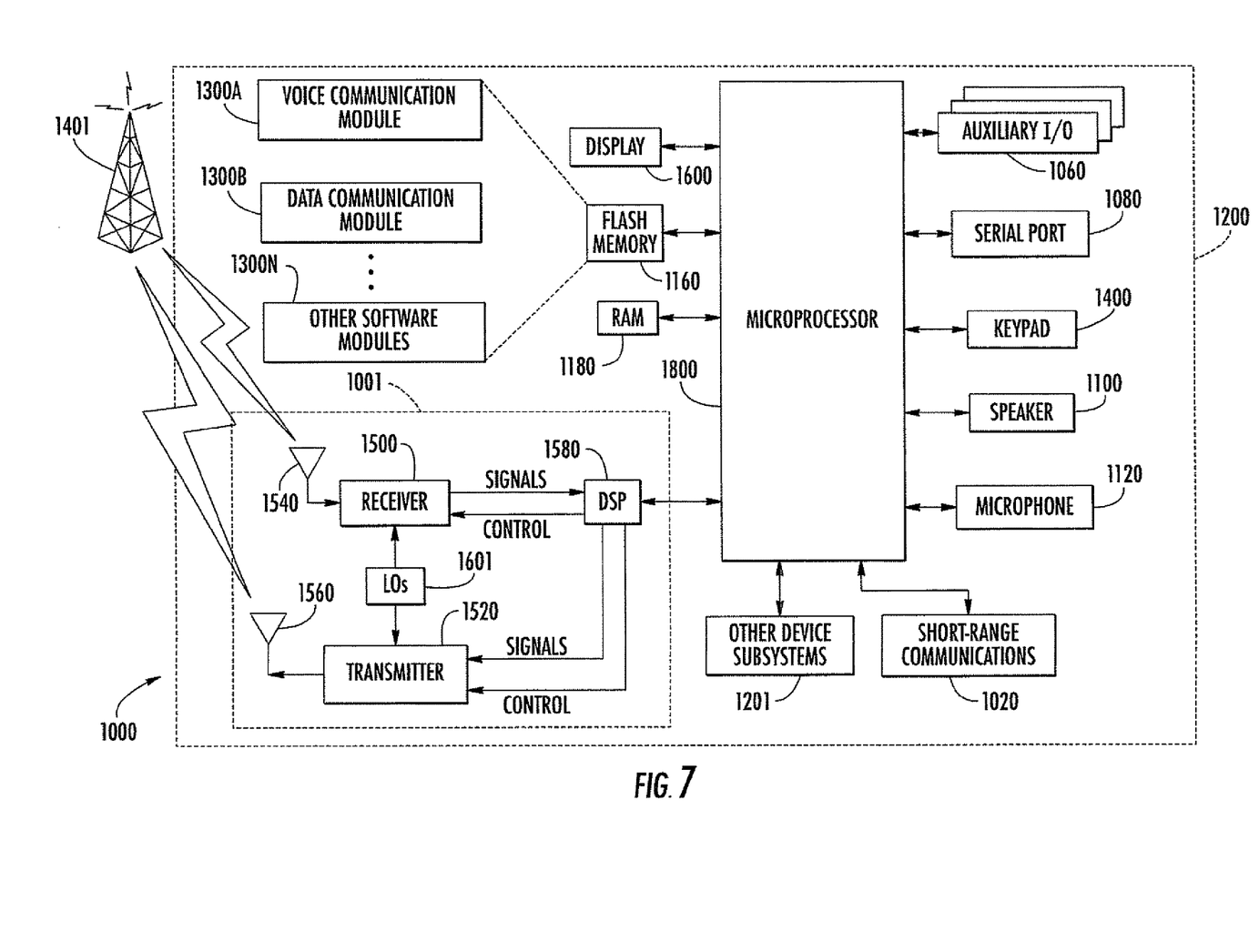
FIG. 7 is a schematic block diagram illustrating example components of a mobile wireless communications device that may be used with the communications systems of FIGS. 1-5.

In addition to the processing device 1800, other parts of the mobile device 1000 are shown schematically in FIG. 7. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOS) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data. TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A communications system comprising:
 a plurality of slave mobile wireless communications devices each having a first near field communications (NFC) device; and
 a master mobile wireless communications device comprising a second NFC device, and a processor coupled to said second NFC device and configured to:
 perform different types of associations comprising:
  associating different audio/video files with different respective slave mobile wireless communications devices via NFC communication with said plurality of slave mobile wireless communications devices,
  associating different audio/video files with different respective slave mobile wireless communications devices via a priority list specifying a respective slave mobile wireless communications device to receive a given audio/video file based upon content associated with the given audio/video, and
  associating different audio/video files with different respective slave mobile wireless communications devices via user input on a touch sensitive display of the master mobile wireless communications device, comprising a gesture of dragging media content from the display onto another display of a respective slave mobile wireless communications device during presentation of the media content; and
 send different audio/video files to different respective slave mobile wireless communications devices based upon association by the processor.

2. The communications system of claim 1, wherein said plurality of slave mobile wireless communications devices have different media playback features; and wherein said processor further associates different audio/video files with different respective slave mobile wireless communications devices based upon different media playback features.

3. The communications system of claim 2, wherein the different media playback features comprise at least one of video playback capability, audio playback capability, text display capability, or playback quality.

4. The communications system of claim 2, wherein different audio/video files comprise different media types; and wherein said processor further associates different audio/video files with different respective slave mobile wireless communications device based upon matching media playback features with the media types.

5. The communications system of claim 4, wherein the different media types comprise at least one of video, audio, or text.

6. The communications system of claim 1, wherein said plurality of slave mobile wireless communications devices have different media playback features; and wherein said processor splits different portions of an audio/video file to different respective slave mobile wireless communications devices based upon the different media playback features.

7. The communications system of claim 1, wherein said master mobile wireless communications device further comprises an input device; and wherein said processor cooperates with said input device to generate the priority list.

8. The communications system of claim 1, wherein a given slave mobile wireless communications device comprises a touch sensitive display; and wherein said master mobile wireless communications device further associates an audio/video file with the given slave mobile wireless communications device based upon the touch sensitive display thereof.

9. The communications system of claim 1, wherein said processor sends a presentation time for a given portion of an audio/video file to at least one slave mobile wireless communications device.

10. A master mobile wireless communications device for communication with a plurality of slave mobile wireless communications devices each having a first near field communications (NFC) device, the master mobile wireless communications device comprising:
 a second NFC device;
 a processor coupled to said second NFC device and configured to:
 perform different types of associations comprising:
  associating different audio/video files with different respective slave mobile wireless communications devices via NFC communication with said plurality of slave mobile wireless communications devices,
  associating different audio/video files with different respective slave mobile wireless communications devices via a priority list specifying a respective slave mobile wireless communications device to receive a given audio/video file based upon content associated with the given audio/video file, and
  associating different audio/video files with different respective slave mobile wireless communications devices via user input on a touch sensitive display of the master mobile wireless communications device, comprising a gesture of dragging media content from the display onto another display of a respective slave mobile wireless communications device during presentation of the media content; and
 send different audio/video files to different respective slave mobile wireless communications devices based upon association by the processor.

11. The master mobile wireless communications device of claim 10, wherein said processor further associates audio/video files with different respective slave mobile wireless communications devices based upon different media playback features.

12. A method of operating a master mobile wireless communications device, the method comprising:
 associating different audio/video files with different respective slave mobile wireless communications devices among a plurality of slave mobile wireless communications devices, each slave mobile wireless communications device having a first near field communications (NFC) device, wherein the associating is performed by a processor configured to perform different types of associations comprising: associating different audio/video files with different respective slave mobile wireless communications devices via NFC communication with the plurality of slave mobile wireless communications devices, associating different audio/video files with different respective slave mobile wireless communications devices via a priority list specifying a respective slave mobile wireless communications device to receive a given audio/video file based upon content associated with the given audio/video file, and associating different audio/video files with different respective slave mobile wireless communications devices via user input on a touch sensitive display of the master mobile wireless communications device, comprising a gesture of dragging media content from the display onto another display of a respective slave mobile wireless communications device during presentation of the media content; and sending different audio/video files to different respective slave mobile wireless communications devices based upon association by the processor.

13. The method of claim 12, wherein the plurality of slave mobile wireless communications devices have different media playback features; and wherein different audio/video files are further associated with different respective slave mobile wireless communications devices based upon the different media playback features.

14. The method of claim 13 wherein the different media playback features comprise at least one of video playback capability, audio playback capability, text display capability, or playback quality.

15. The method of claim 13, wherein different audio/video files comprise different media types; and wherein different audio/video files are further associated with different respective slave mobile wireless communications devices based upon matching media playback features with the media types.

16. The method of claim 15, wherein the different media types comprise at least one of video, audio, or text.

17. The method of claim 12, wherein the plurality of slave mobile wireless communications devices have different media playback features; and wherein different audio/video files are further associated with different respective slave mobile wireless communications devices based upon the different media playback features.

18. The method of claim 12, wherein an audio/video file is further associated with a given slave mobile wireless communications device based upon a touch sensitive display thereof.

19. The method of claim 12, further comprising sending a presentation time for a given content item to an associated respective slave mobile wireless communications device.

* * * * *